April 8, 1958      F. H. MUELLER      2,829,668
LUBRICATED ROTARY PLUG VALVE
Filed May 13, 1954      4 Sheets-Sheet 1
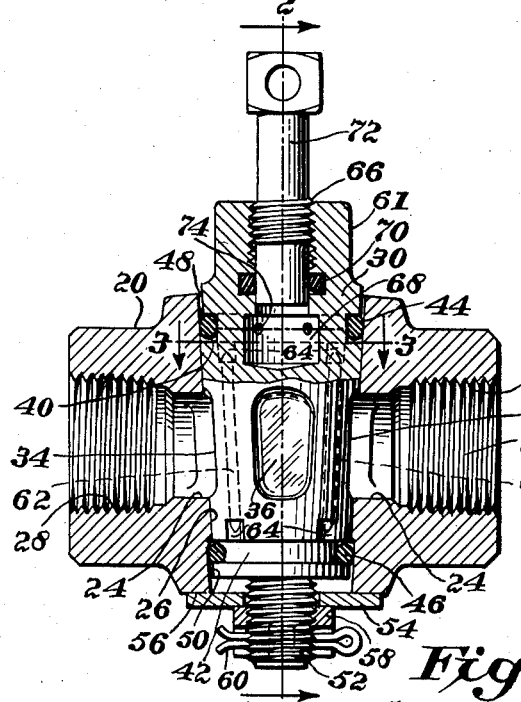
INVENTOR:
Frank H. Mueller,
BY Cushman, Darby & Cushman
ATTORNEYS.

INVENTOR:
Frank H. Mueller,
BY Cushman, Darby & Cushman
ATTORNEYS.

April 8, 1958 F. H. MUELLER 2,829,668
LUBRICATED ROTARY PLUG VALVE
Filed May 13, 1954 4 Sheets-Sheet 3

INVENTOR:
Frank H. Mueller,
BY Cushman, Darby & Cushman
ATTORNEYS.

April 8, 1958

F. H. MUELLER 2,829,668

LUBRICATED ROTARY PLUG VALVE

Filed May 13, 1954

INVENTOR:

*Frank H. Mueller,*

BY *Cushman, Darby & Cushman*

ATTORNEYS.

United States Patent Office 2,829,668
Patented Apr. 8, 1958

2,829,668

LUBRICATED ROTARY PLUG VALVE

Frank H. Mueller, Decatur, Ill., assignor to Mueller Co., Decatur, Ill., a corporation of Illinois Application May 13, 1954, Serial No. 429,507

12 Claims. (Cl. 137—246.16)

This invention relates to rotary plug valves, and more particularly to improvements in lubricated rotary plug valves of the type shown in United States Patent No. 2,653,791 to Mueller. This invention is a continuation-in-part of my copending application, Serial No. 252,702, filed October 23, 1951, now abandoned.

In the valve shown in the aforementioned patent, a circumferential groove is formed in one of the opposed surfaces of the plug and the valve seat adjacent both ends of the latter. Positioned in these grooves are O-rings which provide end seals between the seat and plug at both ends of the seat. One or more longitudinal lubricant channels, in one of the opposed surfaces of the plug and the seat, extend between and connect the inner sides of the O-ring grooves. Thus, there is formed a closed lubricant system which includes the longitudinal lubricant channel, or channels, and the lubricant reservoir space in the O-ring grooves at the inner side of the rings therein.

When lubricant under pressure is introduced into this closed lubricant system, the O-rings are deformed by such pressure and squeezed into the corners formed by the outer side wall of their grooves and the surfaces opposite the grooves, to thus tightly seal the seat bore at both ends thereof. At the same time, the O-rings constantly tend to resume their original configuration, to thereby exert a force on the lubricant and maintain pressure thereon. This lubricant-pressure-maintaining feature is extremely important in a lubricated plug valve, since adequate lubrication of the valve on turning movements of the plug will not be assured unless the lubricant channels are kept full of lubricant so that the latter can be wiped onto the sealing surface opposed to the channel. With each turn of the plug, some lubricant is dissipated from the lubricant channels, but the channels are immediately replenished with lubricant from the aforementioned reservoirs by the pressure exerted on the lubricant by the O-rings.

In the aforementioned valve, the longitudinal lubricant channels are of relatively-small cross section, and since lubricant commonly used in rotary plug valves is relatively thick and viscous, the lubricant flows quite slowly under pressure. Hence, when one of the lubricant channels is exposed to a port, or to a false port, in the plug or the valve casing, very little lubricant is extruded from the channel into the port by the pressure in the lubricant system. Nevertheless, some lubricant is lost by extrusion at each operation of the valve, so eventually the lubricant in the system will need to be replenished. In some instances, however, it is highly desirable for a lubricated plug valve to operate over even longer periods of time without necessity of replenishing the lubricant. An example of such valves are curb stops that are buried in the ground and very difficult of access for lubricant recharging.

Therefore, it is an object of this invention to provide a lubricated plug valve of the type shown in United States Patent No. 2,653,791, with means for interrupting communication between the longitudinal lubricant channels and the O-ring grooves whenever a channel is exposed to a port, or a false port.

By so interrupting such communication, when any longitudinal lubricant channel is exposed to a plug or a casing port, or false port, the pressure on the lubricant in the channel is relieved during such exposure, so that lubricant will not be lost from the system by pressure extrusion into such port. When the lubricant channel is moved away from exposure to a port, however, the lubricant pressure is reestablished, so that any lubricant lost from the channel by wiping action is immediately replenished from the reservoirs. The amount of lubricant lost by wiping action is very small, however, so that the system needs to be replenished with lubricant only after a very large number of operations of the valve.

It has also been found in valves of the aforementioned type that, when the system is charged with lubricant under pressure, unless a check valve is incorporated in the charging port, the pressure of the lubricant system will be lost by extrusion of the lubricant back through the port whenever an appropriate closure, such as a threaded plug, for the port is removed. While check valves for the charging ports of lubricated plug valves are known in the art, it is another object of this invention to utilize one of the aforementioned O-rings as a check valve for the charging port of the lubricant system, in addition to its other functions of sealing and also maintaining pressure on the lubricant in the system.

Other objects and advantages of the invention will become apparent from the following description and accompanying drawings, in which:

Figure 1 is a vertical sectional view through a lubricated rotary plug valve embodying this invention.

Figure 2 is a sectional view taken on line 2—2 of Figure 1.

Figure 3 is a fragmentary horizontal sectional view taken on line 3—3 of Figure 1.

Figure 4 is a sectional view corresponding to Figure 1, but with the valve plug omitted.

Figure 5 is an enlarged fragmentary vertical sectional view taken substantially on line 5—5 of Figure 3.

Figure 6:
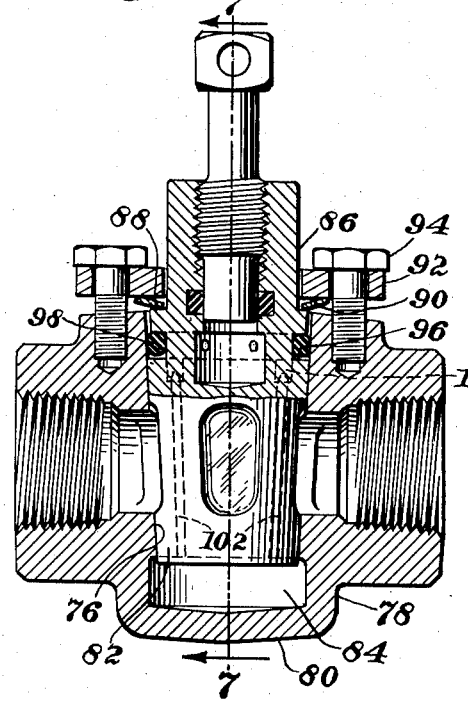
Figure 7:
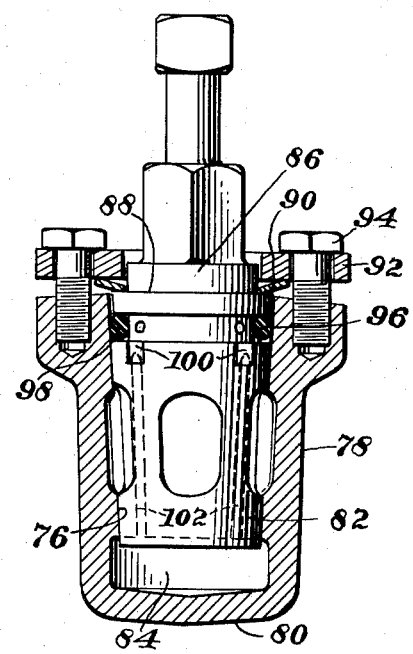
Figure 8:
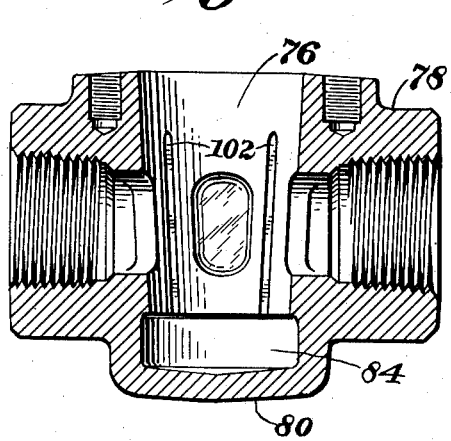

Figures 6, 7, and 8 are views corresponding to Figures 1, 2, and 4, respectively, but illustrating the application of this invention to a different type of rotary plug valve.

Figure 9:
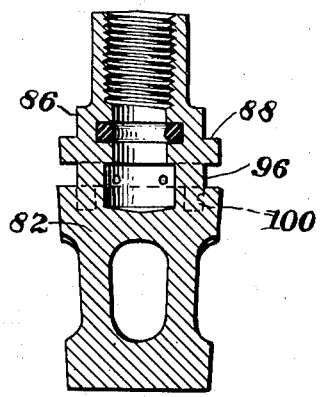

Figure 9 is a vertical sectional view of the valve plug shown in Figure 6.

Figure 10:
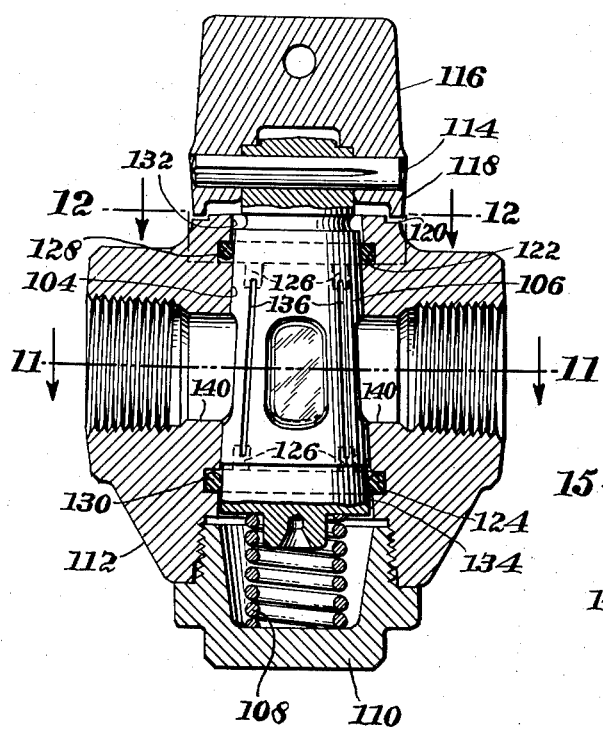

Figure 10 is a vertical sectional view through still another type of rotary plug valve embodying this invention.

Figure 11:
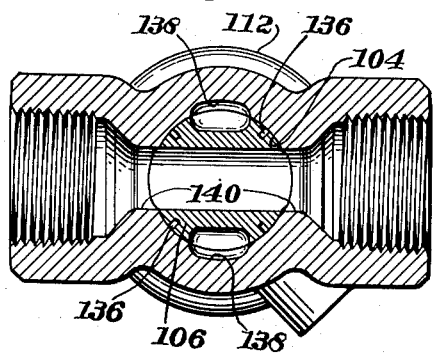
Figure 12:
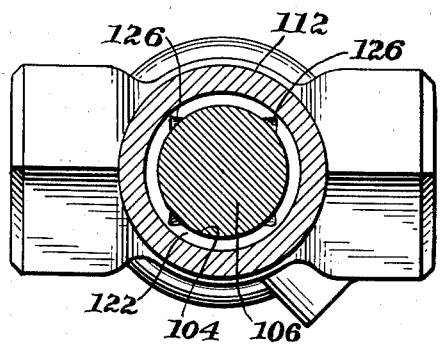

Figures 11 and 12 are horizontal sectional views taken on lines 11—11 and 12—12, respectively, of Figure 10.

Figure 13:
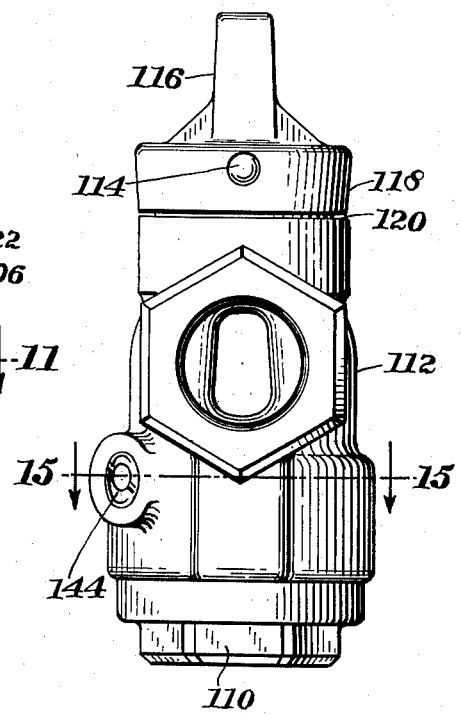

Figure 13 is an end elevational view of the valve shown in Figure 10.

Figure 14:
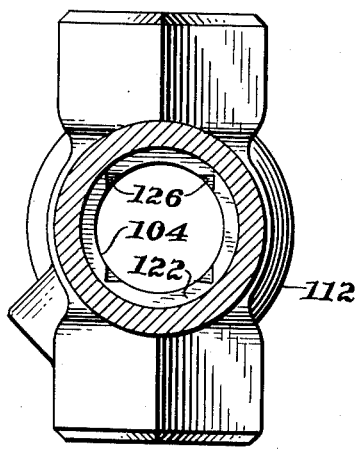

Figure 14 is a horizontal sectional view corresponding to Figure 12, but with the valve plug omitted.

Figure 15:
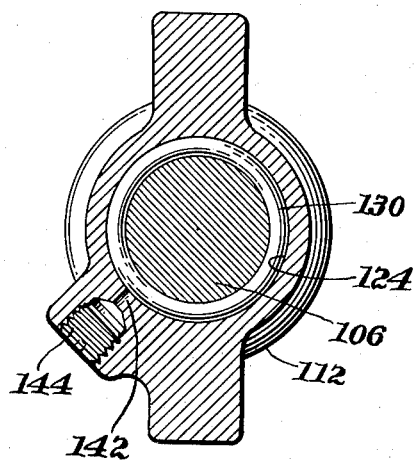

Figure 15 is a horizontal sectional view taken on line 15—15 of Figure 13.

Figure 16:
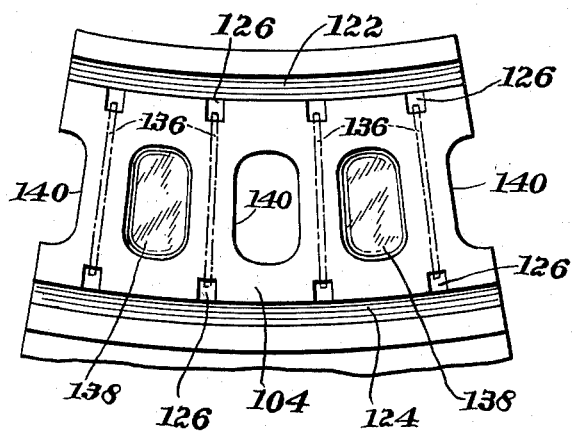

Figure 16 is a view showing the development of the valve seat of the valve shown in Figure 10, with the longitudinal lubricant channels formed in the valve plug superimposed in dotted lines.

Referring now to Figures 1 to 5 of the drawings, there is shown a rotary plug valve embodying this invention. The valve has a casing 20 provided with a flow passage 22 having aligned ports 24 in a tapered plug seat 26 formed by a bore transversely intersecting the flow passage. As is usual, the outer ends of the flow passage 22 may be interiorly threaded, as at 28, for connection into a pipe line (not shown). Rotatably engaged with the valve seat 26 is a tapered valve plug 30 having a flow passage 32 provided with ports 34 at its opposite ends that are alignable with the casing or seat ports 24. Turning movements of the plug 30 in the seat 26 either align or disalign the plug ports 34 with the casing ports 24 to open or close the valve.

Preferably, the plug 30 and seat 26 are also provided with false or blind ports 36 and 38, respectively, spaced 90° from the plug and seat ports 34 and 24, respectively. The plug false ports 36 register with the seat ports 24, and the seat false ports 38 register with the plug ports 34 in the closed position of the valve. In the open position of the valve, the plug false ports 36 register with the seat false ports 38. The provision of these false ports both reduces the area of metal-to-metal engagement between the plug 30 and its seat 26, to thus reduce resistance to turning movements of the plug, and eliminates prolonged exposure of any portions of the plug and seat sealing surfaces to corrosive action of the fluid controlled by the valve.

The plug 30, at each end thereof, is provided with a circumferential packing groove 40 and 42, preferably rectangular in radial section and opposed to the valve seat 26. Disposed in the grooves 40 and 42 are resilient pressure-deformable packing rings 44 and 46, respectively, commonly known in the art as "O-rings." The O-rings 44 and 46 are substantially circular in radial section when relaxed, but are of such a size that when they are positioned in their grooves 40 and 42 they are compressed somewhat and contact both the bottom of their corresponding grooves and the opposed surface of the valve seat 26, to thus form end seals between the opposed surfaces of the plug 30 and its seat. The grooves 40 and 42, preferably, are somewhat wider than their O-rings, so that an annular space exists between the inner side wall of the grooves and the opposed side of the O-rings therein, as best shown in Figure 5. These spaces constitute lubricant reservoirs, described more in detail hereinafter.

Between the two O-ring grooves 40 and 42, the opposed surfaces of the plug and the seat are in metal-to-metal contact to obtain a tight sealing engagement therebetween. Preferably, these surfaces are ground to one another by means well known in the art. At its larger end, the exterior surface of the plug 30, preferably, is relieved outwardly beyond the upper O-ring groove 40, as at 48, so that the opposed surfaces of the plug and the seat are spaced apart outwardly beyond the upper O-ring. The seat 26, at its smaller end, preferably is also relieved outwardly beyond the lower O-ring, as at 50, so that the opposed surfaces of the plug and the seat are spaced apart outwardly beyond the lower O-ring, for purposes described more in detail in the above-mentioned patent.

The plug 30 is adjusted and fixed in its proper seating engagement with the valve seat 26 by means of a reduced threaded extension 52 on the lower end of the plug. A metallic washer 54 of somewhat resilient construction surrounds the threaded extension 52 and at its outer periphery bears against an annular bearing area 56 on the casing 20 surrounding the smaller end of the seat 26. Threaded onto the extension 52 and engaged against the inner periphery of the washer 54 is a castellated nut 58, which, after the nut is adjusted to properly engage the plug 30 in its seat 26, may be locked in fixed position on the threaded extension 52 by a cotter pin 60 extending through the threaded extension. At its larger end, the valve plug 30 extends outwardly of the seat 26 and has a square, hexagonal, or otherwise suitably-shaped end 61 for engagement by an appropriate tool to turn the plug in its seat.

Four longitudinal lubricant channels 62 are formed in the surface of the valve seat 26. These channels 62 are substantially equally spaced circumferentially of the valve seat 26, as shown in Figure 3, but are angularly offset, approximately 45°, from the seat ports 24. At both ends, each lubricant channel 62 terminates short of the packing grooves 40 and 42 in the valve plug 30, so that, unless otherwise provided for, the longitudinal lubricant channels do not communicate with the O-ring grooves. In order to provide such communication, the rims of the inner side wall of both O-ring grooves 40 and 42 are provided with four substantially equally and circumferentially spaced notches or recesses 64 which extend in the surface of the plug 30 inwardly of the grooves a sufficient distance to overlap the end of a corresponding lubricant channel 62 in the valve seat 26 when the valve is in its open or in its closed position.

It thus will be seen that, when the valve is in its open or in its closed position, the aforedescribed lubricant reservoirs at the inner sides of the O-rings 44 and 46 in the plug grooves, together with the longitudinal lubricant channels 62 and the notches or recesses 64, form a closed lubricant system. When lubricant is introduced under pressure into this system, it fills the longitudinal lubricant channels 62, the notches 64, and the lubricant reservoirs, to thus squeeze the O-rings 44 and 46 outwardly into the corners formed by the outer side walls of their grooves 40 and 42 and the opposed surface of the valve seat 26. Thus, the compression of the O-rings 44 and 46 by lubricant pressure, or by the pressure of the fluid being controlled by the valve, forms an extremely-tight and effective end seal at each end of the seat 26. Additionally, when the O-rings are deformed into the aforementioned corners by lubricant pressure, they constantly tend to resume their original shape, to thus maintain pressure on the lubricant in the system. In this sense, the O-rings act as pressure-accumulators.

The aforedescribed notches 64 are narrow enough so that, when the plug 30 is initially rotated from either its open or closed position a distance sufficient to expose a lubricant channel 62 to a plug port 34 or false port 36, the corresponding notches are out of overlapping relationship with the ends of the lubricant channel 62, to thus interrupt or cut off communication between the lubricant reservoirs and the lubricant channel. Accordingly, when a longitudinal lubricant channel 62 is exposed to a plug port 34 or false port 36, no pressure exists in such channel, and, consequently, lubricant will not be extruded therefrom into the port to which it is exposed. Therefore, on turning movements of the plug 30, the only lubricant lost from the channels 62 is the small amount occasioned by the wiping action of the sealing surfaces of the plug over the channels. Such wiping action serves to spread lubricant between the opposed sealing surfaces of the valve plug 30 and its seat 26. When the plug 30 has completed its rotation between open and closed positions of the valve, the notches 64 and the ends of the lubricant channels 62 are again brought into their overlapping relationship, so that the channels are again subjected to the pressure of the lubricant in the reservoirs. Hence, any lubricant which has been dissipated from the channels 62 by the aforedescribed wiping action will be immediately replenished by lubricant from the reservoirs. Since the amount of lubricant dissipated by such wiping action is extremely small, it will be seen that only a very small quantity of lubricant from the reservoirs is needed to replenish the lubricant channels 62. Accordingly, once the lubricant system has been charged with lubricant under pressure, the pressure will be maintained over a long period of time, even with a great number of operations of the valve. Hence, the valve will be maintained in adequate lubricated condition over prolonged periods of operation and without the necessity of recharging the system with lubricant.

In order to charge the system with lubricant, an axial bore 66 is provided in the larger end of the plug 30 and enlarged at its inner end to form a lubricant chamber 68. The outer end of the bore 66 is threaded, while inwardly of the threads the bore has a smooth cylindrical surface of a diameter at least as small as the crest diameter of the threads. The smooth-walled bore section is provided with a circumferential packing groove having an O-ring 70 disposed therein. Again, the diameter of the O-ring 70 in radial section is somewhat greater than the depth of its groove, so that the inner diameter of the O-ring is slightly less than that of the smooth-walled bore section. Threaded into the outer end of the bore 66 is a charging plunger 72 having an inner smooth-walled cylindrical section in sealing engagement with the O-ring 70. Leading radially outwardly from the lubricant chamber 68 are a plurality of passageways 74 that open at their outer ends to the bottom of the O-ring groove 40. Since, as aforedescribed, the O-ring 44 is normally compressed in its groove 40 so that its inner diameter it is substantially flattened into contact with the flat bottom of its groove, the O-ring 44 normally covers the outer ends of the radial passageways 74, as shown in Figure 5.

In order to charge the valve with lubricant, the plunger 72 is unscrewed from the bore 66 and lubricant is deposited in the bore and lubricant chamber 68. Thereafter the plunger 72 is replaced and screwed inwardly to exert pressure on the lubricant in the lubricant chamber. Thereupon, lubricant flows outwardly through the radial passageways 74 and pushes the inner side of the O-ring 44 away from its sealing engagement with the outer ends of the passageways 74 to permit lubricant to flow into the O-ring groove 40 at the inner side of the O-ring 44 therein and fill the lubricant reservoir and upper notches 64 with lubricant under pressure. If the valve is in its open or closed position, and preferably is, when the plunger 74 is being forced inwardly of the bore 66, lubricant under pressure will likewise flow completely through the entire lubricant system and charge the same with lubricant under pressure. At the same time, both O-rings 44 and 46 will be compressed as aforedescribed into the corner formed by the outer side wall of the grooves 40 and 42 and the opposed surface of the valve seat 26, to thereby maintain pressure on the lubricant in the system. When, after many operations of the valve, sufficient lubricant is dissipated from the system to cause an appreciable drop of lubricant pressure, the pressure can be reestablished by merely a turn or two of the plunger 72.

After the lubricant system is so charged, the resiliency of the O-ring 44 causes it to act in the nature of a check valve and to reclose the outer ends of the radial passageways 74 in the plug 30, so that system pressure will not be lost when the plunger 72 is removed from the bore 66. In this connection, it is pointed out that the outer ends of the passageways 74 are positioned somewhat to the inner side of the torous axis of the O-ring 44, so that the preponderance of the lubricant pressure exerted against the O-ring 44 through the radial passageways will act at the inner side of such axis and serve to lift the O-ring 44 only at its inner side to preclude the possibility of lubricant flowing into the O-ring groove 40 at the outer sides of the O-ring 44 therein.

The invention is equally applicable to that type of rotary plug valve shown in Figures 6 and 9, wherein the bore forming the valve seat 76 does not extend completely through the valve casing, but is enlarged at its inner end adjacent the small end of the seat. Hence, the casing portion 80 which extends across the bore, together with the corresponding small end of the plug 82, forms a pocket or chamber 84. Outwardly of the large end of the seat 76, the plug 82 has a reduced extension 86 that forms an outwardly-facing shoulder 88, against which the inner peripheral edge of a dished resilient washer or Belleville spring 90 is engaged. The outer periphery of the washer 90 is engaged by a heavy flat ring 92 which surrounds the plug extension 86 and is urged against the outer peripheral edge of the washer to yieldingly retain the plug 82 in its seat 76 by a plurality of cap screws 94 which extend through appropriate holes in the ring and into threaded engagement with the valve casing 78. In this type of construction, there is a packing groove 96, and O-ring 98, and notches 100 only at the large end of the plug 82, since the casing portion 80 seals the seat bore at the small end of the seat 76. The longitudinal lubricant channels 102 in the valve seat 76 extend completely to the small end thereof and are in open and constant communication with the pocket 84. Hence, when the valve is initially charged with lubricant, as aforedescribed, the pocket 84 will also be completely filled with lubricant.

The invention may also be practiced by forming the O-ring grooves and their notches in the valve seat and the longitudinal lubricant channels in the valve plug. This type of construction is shown in Figures 10 to 16, wherein the invention has been applied to a rotary plug valve of the type usually termed in the art an "inverted curb stop," which is used primarily for controlling the flow of gas under high pressure. In this type of construction, the small end of the valve seat 104 is uppermost and the plug 106 is retained in engagement with the seat 104 by a coil compression spring 108 which engages the large end of the valve plug and also the inner side of a closure plug 110 threaded into an enlarged section of the seat bore at the large end of the valve seat 104. The smaller end of the valve plug 106 extends outwardly beyond the valve casing 112 and has secured thereto, by a transverse pin 114, a heavy flat head 116 provided with a depending peripheral skirt 118 that is disposed in close proximity to an annular area 120 on the corresponding opposed end of the casing 112. It will be seen that, although the space between the lower end of the skirt 118 and the casing area 120 is very small, the plug 106 can be unseated slightly, if necessary, to permit it to be turned easily. Of course, once the unseating force on the head 116 has been relieved, the coil compression spring 108 immediately reseats the plug 106 in tight sealing engagement with the seat 104.

In this construction, O-ring grooves 122 and 124 and their notches 126 are formed in the valve seat 104 at both ends thereof, with O-rings 128 and 130 disposed in the grooves. Again, as in the constructions illustrated in Figures 1 to 5, the seat 104 is relieved, as at 132, outwardly beyond the O-ring groove 122 at the smaller end of the seat, while the plug 106 is relieved, as at 134, outwardly beyond the O-ring groove 124 at the larger end of the seat, so that it is only between the O-ring grooves that the opposed surfaces of the plug and seat are in metal-to-metal sealing engagement. Longitudinal lubricant channels 136 are formed in the exterior surface of the plug 106 and, as in the aforedescribed constructions, terminate short of the inner sides of the O-ring grooves 122 and 124, but overlap their corresponding recesses or notches 126 when the valve is in its open or closed position. Likewise, as in the previously-described embodiments, when the plug 106 is rotated sufficiently from its open or closed position so that any one of the longitudinal lubricant channels 136 is exposed to a false port 138 in the valve seat 104 or to one of the flow ports 140 of the casing 112, the channel is cut off from communication with the lubricant reservoirs at the inner sides of the O-rings 128 and 130 in the grooves 122 and 124, because the ends of the channels are moved out of overlapping relation with the notches 126.

In this embodiment, the lubricant system is charged through a lubricant charging port or passage 142 which extends radially outwardly through the casing 112 from the bottom of the lower O-ring groove 124. The inner end of the charging passage 142 is normally sealed by the lower O-ring 130. At its outer end, the charging passage 142 is enlarged and threaded for the reception of a closure plug 144. In order to initially charge the system with lubricant, the plug 144 is removed, a quantity of lubricant deposited in the enlarged outer end of the charging port 142, and the plug screwed back into the charging port, to thereby force the lubricant throughout the entire lubricant system. As was described heretofore in connection with the previously-described embodiments, the lower O-ring 130 acts as a check valve to seal the outlet end of the charging passage 142 against loss of lubricant pressure from the system when the closure plug 144 is removed for any reason whatever.

It will thus be seen that the objects of this invention

I claim:

1. A rotary plug valve comprising: a casing having a plug seat and at least one port opening thereto; a plug rotatable in said seat to open and close the valve and having at least one port alignable with said casing port, the opposed surfaces of said plug and seat having sealing engagement in at least a central zone that surrounds said ports; means defining a circumferential groove in one of said surfaces adjacent one end of said seat; a pressure-deformable resilient packing ring in said groove, said ring when relaxed being non-complementary to the outer side wall of said groove and of sufficient size in radial section to contact both the bottom of said groove and the other of said surfaces to thereby seal one end of said seat; means for sealing the other end of said seat; means defining at least one longitudinal lubricant channel in one of said surfaces extending substantially the length of said zone but terminating short of said groove; recess means in that one of said surfaces opposed to said channel for providing, in the open and closed positions of the valve, communication between said channel and said groove at the inner side of said ring therein to form with said groove and channel a closed lubricant system, and for interrupting said communication, when said channel is exposed to one of said ports by rotation of said plug, said recess means being non-exposable to either of said ports by said rotation; and means for supplying lubricant under pressure to said system including a passage having an outlet port in the bottom of said groove normally sealed by said packing ring.

2. A rotary plug valve comprising: a casing having a tapered plug seat and at least one port opening thereto; a tapered plug rotatable in said seat to open and close the valve and having at least one port alignable with said casing port, the opposed surfaces of said plug and seat having sealing engagement in at least a central zone that surrounds said ports; means defining a circumferential groove in one of said surfaces adjacent both ends of said seat; a pressure-deformable resilient packing ring in each of said grooves, each said ring when relaxed being non-complementary to the outer side wall of its corresponding groove and of sufficient size in radial section to contact both the bottom of its said corresponding groove and the other of said surfaces to thereby seal both ends of said seat; means defining at least one longitudinal lubricant channel in one of said surfaces extending substantially the length of said zone but terminating short of said grooves; recess means in that one of said surfaces opposed to said channel for providing, in the open and closed positions of the valve, communication between said channel and said grooves at the inner sides of said rings therein to form, with said grooves and channel, a closed lubricant system, and for interrupting said communication when said channel is exposed to one of said ports by rotation of said plug, said recess means being non-exposable to either of said ports by said rotation; and means for supplying lubricant under pressure to said system including a passage having an outlet port in the bottom of one of said grooves normally sealed by the packing ring therein.

3. A rotary plug valve comprising: a casing having a plug seat and at least one port opening thereto; a plug rotatable in said seat to open and close the valve and having at least one port alignable with said casing port, the opposed surfaces of said plug and seat having sealing engagement in at least a central zone that surrounds said ports; means defining a circumferential groove in one of said surfaces adjacent one end of said seat; a pressure-deformable resilient packing ring in said groove, said ring when relaxed being non-complementary to the outer side wall of said groove and of sufficient size in radial section to contact both the bottom of said groove and the other of said surfaces to thereby seal one end of said seat; means for sealing the other end of said seat; means defining at least one longitudinal lubricant channel in one of said surfaces extending substantially the length of said zone and communicating, in at least the open and closed positions of the valve, with said groove at the inner side of said ring therein to form a closed lubricant system; and means for supplying said system with lubricant under pressure including a passage having an outlet port in the bottom of said groove normally sealed by said ring.

4. The structure defined in claim 3 in which the groove is in the seat surface and the passage is in the casing.

5. The structure defined in claim 3 in which the groove is in the plug surface and the passage is in the plug.

6. A rotary plug valve comprising: a casing having a tapered plug seat and at least one port opening thereto; a tapered plug rotatable in said seat to open and close the valve and having at least one port alignable with said casing port, the opposed surfaces of said plug and seat having sealing engagement in at least a central zone that surrounds said ports; means defining a circumferential groove in one of said surfaces adjacent both ends of said seat; a pressure-deformable resilient packing ring in each of said grooves, each said ring when relaxed being non-complementary to the outer side wall of its corresponding groove and of sufficient size in radial section to contact both the bottom of its said corresponding groove and the other of said surfaces to thereby seal both ends of said seat; means defining at least one longitudinal lubricant channel in one of said surfaces extending substantially the length of said zone and communicating, in at least the open and closed positions of the valve, with said grooves at the inner side of said rings therein to form a closed lubricant system; and means for supplying said system with lubricant under pressure including a passage having an outlet port in the bottom of one of said grooves normally sealed by the ring therein.

7. The structure defined in claim 6 in which the groove is in the seat surface and the passage is in the casing.

8. The structure defined in claim 6 in which the groove is in the plug surface and the passage is in the plug.

9. The structure defined in claim 1 in which the groove is substantially rectangular in radial section and the ring is substantially circular in radial section when relaxed.

10. The structure defined in claim 2 in which the one groove is substantially rectangular in radial section and the ring therein is substantially circular in radial section when relaxed.

11. The structure defined in claim 3 in which the groove is substantially rectangular in radial section and the ring is substantially circular in radial section when relaxed.

12. The structure defined in claim 6 in which the one groove is substantially rectangular in radial section and the ring therein is substantially circular in radial section when relaxed.

References Cited in the file of this patent

UNITED STATES PATENTS

| | | |
|---|---|---|
| Re. 17,375 | Nordstrom | July 16, 1929 |
| 1,661,432 | Lincoln | Mar. 6, 1928 |
| 1,915,068 | Milliken | June 20, 1933 |
| 2,041,669 | Whittle | May 19, 1936 |
| 2,169,810 | Mueller | Aug. 15, 1939 |
| 2,216,150 | Wilkins | Oct. 1, 1940 |
| 2,336,027 | Milliken | Dec. 7, 1943 |
| 2,427,789 | Kehle | Sept. 23, 1947 |
| 2,556,308 | Weatherhead | June 12, 1951 |
| 2,614,793 | Storm | Oct. 21, 1952 |
| 2,616,657 | Martin | Nov. 4, 1952 |
| 2,653,791 | Mueller | Sept. 29, 1953 |
| 2,738,803 | Manning | Mar. 20, 1956 |